United States Patent
Cordery et al.

(10) Patent No.: US 6,526,391 B1
(45) Date of Patent: Feb. 25, 2003

(54) SYSTEM AND METHOD FOR CONTROLLING A POSTAGE METERING SYSTEM USING DATA REQUIRED FOR PRINTING

(75) Inventors: Robert A. Cordery, Danbury, CT (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/242,208
(22) PCT Filed: Jun. 12, 1998
(86) PCT No.: PCT/US98/12438
§ 371 (c)(1), (2), (4) Date: May 21, 1999
(87) PCT Pub. No.: WO98/57306
PCT Pub. Date: Dec. 17, 1998

Related U.S. Application Data
(60) Provisional application No. 60/049,518, filed on Jun. 13, 1997.

(51) Int. Cl.$^7$ .............................................. G07B 17/00
(52) U.S. Cl. ........................................ 705/60; 705/410
(58) Field of Search ............................ 705/50, 60, 401, 705/410

(56) References Cited

U.S. PATENT DOCUMENTS

| | | | |
|---|---|---|---|
| 4,180,856 A | 12/1979 | Check, Jr. et al. | 705/407 |
| 4,376,299 A | 3/1983 | Rivest | 364/900 |
| 4,376,981 A | 3/1983 | Check, Jr. et al. | 705/401 |
| 4,423,287 A | 12/1983 | Zeidler | 178/22.08 |
| 4,556,944 A | 12/1985 | Daniels et al. | 705/407 |
| 4,567,359 A | 1/1986 | Lockwood | 235/381 |
| 4,578,530 A | 3/1986 | Zeidler | 178/22.09 |
| 4,725,718 A * | 2/1988 | Sansone et al. | 235/495 |

(List continued on next page.)

FOREIGN PATENT DOCUMENTS

| | | |
|---|---|---|
| EP | 0833285 A2 * | 4/1998 |
| JP | 06-284124 A | 10/1994 |

OTHER PUBLICATIONS

Gask: "What was lick and stick has now become click"; ABIX—Australasian Business Intelligence (Daily Commercial News) Apr. 14, 1998, p. 20, ( Abstract Only).*

"Information Based Indicia Program (IBIP) Indicium Specification," United States Postal Service, Draft dated Jul. 23, 1997.

(List continued on next page.)

Primary Examiner—Edward R. Cosimano
(74) Attorney, Agent, or Firm—Brian A. Lemm; Charles R. Walandra, Jr.; Angelo N. Chaclas (57) ABSTRACT

A method for controlling a postage metering system (1) defines a first set of postage parameters P1, P2, P3 to Pn associated with the generation of postage evidence in a postage metering system (10) and then initializes the postage metering system (10) with a subset of the first set of postage parameters F1, F2, F3 to Fn. The subset F1, F2, F3 to Fn defines a combination of the postage parameters for which the generation of postage evidence is not authorized. When a request for postage evidence is received, the request includes a second set of postage parameters P1, P2, P3 to Pn that are combined to form a postage parameter vector (PPV). The generation of postage evidence is inhibited when at least one of the postage parameters P1, P2, P3 to Pn in the second set matches one of the postage parameters in the first set F1, F2, F3 to Fn. When none of the postage parameters P1, P2, P3 to Pn in the second set matches one of the postage parameters in the first set F1, F2, F3 to Fn the requested postage evidence is generated. In an alternative method the subset defines a combination of the postage parameters for which the generation of postage evidence is authorized, and the requested postage evidence is generated when each of the postage parameters in the first set matches one of the postage parameters in the second set.

8 Claims, 4 Drawing Sheets

U.S. PATENT DOCUMENTS

| | | | | |
|---|---|---|---|---|
| 4,757,537 A | * | 7/1988 | Sansone et al. | 280/51 |
| 4,775,246 A | * | 10/1988 | Edelmann et al. | 705/62 |
| 4,802,218 A | * | 1/1989 | Wright et al. | 705/60 |
| 4,812,994 A | * | 3/1989 | Taylor et al. | 705/410 |
| 4,831,555 A | * | 5/1989 | Sansone et al. | 358/1.14 |
| 4,873,645 A | | 10/1989 | Hunter et al. | 700/231 |
| 4,873,646 A | | 10/1989 | Stoops | 364/487 |
| 4,936,209 A | | 6/1990 | Diel | 101/93.01 |
| 5,128,988 A | | 7/1992 | Cowell et al. | 379/106.03 |
| 5,146,403 A | | 9/1992 | Goodman | 707/102 |
| 5,163,098 A | | 11/1992 | Dahbura | 380/24 |
| 5,191,533 A | | 3/1993 | Haug | 364/464.03 |
| 5,239,168 A | | 8/1993 | Durst, Jr. | 235/432 |
| 5,257,196 A | | 10/1993 | Sansone | 364/464.02 |
| 5,319,562 A | | 6/1994 | Whitehouse | 705/403 |
| 5,410,598 A | | 4/1995 | Shear | 380/4 |
| 5,454,038 A | | 9/1995 | Cordery et al. | 705/60 |
| 5,491,796 A | | 2/1996 | Wanderer et al. | 395/200.09 |
| 5,510,992 A | | 4/1996 | Kara | 705/408 |
| 5,526,428 A | | 6/1996 | Arnold | 380/25 |
| 5,590,198 A | | 12/1996 | Lee et al. | 380/21 |
| 5,625,694 A | * | 4/1997 | Lee et al. | 705/60 |
| 5,680,463 A | * | 10/1997 | Windel et al. | 380/51 |
| 5,699,258 A | | 12/1997 | Thiel | 364/464.19 |
| 5,781,438 A | | 7/1998 | Lee et al. | 364/464.14 |
| 5,812,401 A | | 9/1998 | Moore | 705/410 |
| 5,812,666 A | | 9/1998 | Baker et al. | 380/21 |
| 5,812,991 A | | 9/1998 | Kara | 235/375 |
| 5,822,739 A | | 10/1998 | Kara | 235/375 |
| 5,826,247 A | | 10/1998 | Pintsov et al. | 705/404 |
| 5,943,658 A | | 8/1999 | Gravell et al. | 705/410 |
| 6,005,945 A | | 12/1999 | Whitehouse | 380/51 |
| 6,061,670 A | | 5/2000 | Brand | 705/404 |
| 6,085,181 A | | 7/2000 | Gravell et al. | 705/408 |
| 6,249,777 B1 | | 6/2001 | Kara et al. | 705/404 |
| 6,295,359 B1 | | 9/2001 | Cordery et al. | 380/44 |

OTHER PUBLICATIONS

"Information Based Indicia Program (IBIP) Postal Security Deivce Specification," United States Postal Service, Draft dated Jul. 23, 1997.

"Information Based Indicia Program (IBIP) Host System Specification," United States Postal Service, Draft dated Oct. 9, 1996.

"Information Based Indicia Program (IBIP) Key Management Plan," United States Postal Service, Draft dated Apr. 25, 1997.

* cited by examiner

SYSTEM AND METHOD FOR CONTROLLING A POSTAGE METERING SYSTEM USING DATA REQUIRED FOR PRINTING

RELATED APPLICATIONS

This is a continuation-in-part application of U.S. Provisional Patent Application Ser. No. 60/049,518, filed Jun. 13, 1997, now abandoned, and assigned to the assignee of the present invention.

The present application is related to the following U.S. patent applications Ser. Nos. 09/242,210; 09/242,209; 09/242,206; 09/242,205 and 09/242,207, all being assigned to the assignee of the present invention, all of which are incorporated herein by reference in their entirety.

TECHNICAL FIELD

The present invention relates generally to a postage metering system and method for evidencing postage payment in an open system and, more particularly, to a postage metering system and method for evidencing postage payment in a virtual meter configuration.

BACKGROUND ART

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718, 4,757,537, 4,775,246 and 4,873,645, each assigned to the assignee of the present invention.

Presently, there are two postage metering device types: a closed system and an open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. In a closed system, typically the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

The United States Postal Service ("USPS") has proposed an Information-Based Indicia Program ("IBIP"), which is a distributed trusted system to retrofit and augment existing postage meters using new evidence of postage payment known as information-based indicia. The program relies on digital signature techniques to produce for each envelope an indicium whose origin can be authenticated and content cannot be modified. IBIP is expected to support new methods of applying postage in addition to the current approach, which typically relies on a postage meter to print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being created using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD"), which is a secure processor-based accounting device that dispenses and accounts for postal value stored therein to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). IBIP includes interfacing user, postal and vendor infrastructures which are the system elements of the program. The INFORMATION BASED INDICIA PROGRAM KEY MANAGEMENT PLAN SPECIFICATION, dated Apr. 25, 1997, defines the generation, distribution, use and replacement of the cryptographic keys used by the USPS product/service provider and PSDs ("IBIP KMS Specification"). The specifications are collectively referred to herein as the "IBIP Specifications".

The IBIP Specifications define a stand-alone open metering system, referred to herein as a PC Meter comprising a PSD coupled to a personal computer ("PC") which operates as a host system with a printer coupled thereto ("Host PC"). The Host PC runs the metering application software and associated libraries (collectively referred to herein as "Host Applications") and communicates with one or more attached PSDs. The PC Meter can only access PSDs coupled to the Host PC. There is no remote PSD access for the PC Meter.

The PC Meter processes transactions for dispensing postage, registration and refill on the Host PC. Processing is performed locally between the Host PC and the PSD coupled thereto. Connections to a Data Center, for example for registration and refill transactions, are made locally from the Host PC through a local or network modem/internet connection. Accounting for debits and credits to the PSD is also performed locally, logging the transactions on the Host PC. The Host PC may accommodate more than one PSD, for example supporting one PSD per serial port. Several applications programs running on the Host PC, such as a word processor or an envelope designer, may access the Host Applications.

The IBIP Specifications do not address an IBIP open metering system on a network environment. However, the specifications do not prohibit such a network-based system. Generally, in a network environment a network Server controls remote printing requested by a Client PC on the network. Of course, the Client PC controls any local printing.

One version of a network metering system, referred to herein as a "virtual meter", has many Host PCs without any PSDs coupled thereto. The Host PCs run Host Applications, but all PSD functions are performed on Server(s) located at a Data Center. The PSD functions at the Data Center may be performed in a secure device attached to a computer at the Data Center, or may be performed in the Data Center computer itself. The Host PCs must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. Nos. 5,454,038 and 4,873,645, which are assigned to the assignee of the present invention.

The virtual meter does not conform to all the current requirements of the IBIP Specifications. In particular, the IBIP Specifications do not permit PSD functions to be performed at the Data Center. However, it is understood that a virtual meter configuration with each user's PSD located at the Data Center may provide an equivalent level of security as required by the IBIP Specifications.

In conventional closed system mechanical and electronic postage meters a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the PSD and print head. See, for example, U.S. Pat. No. 4,802,218, issued to Christopher B. Wright et al. and now assigned to the assignee of the present invention. An example of a digital printing postage meter with secure print head communication is the Personal Post Office™ manufactured by Pitney Bowes Inc. of Stamford, Conn.

In U.S. Pat. Nos. 4,873,645 and 5,454,3,038, a virtual metering system and method are disclosed wherein the postal accounting and token generation occur at a data center remote from the postage evidencing printer. Although the Data Center may be a secure facility, there remain certain inherent security issues since the accounting and token generation functions do not occur in a secure device local to the postage printer. The virtual postage metering system includes a computer coupled to an unsecured printer and to a remote data metering system. The postal accounting and the token generation occur at the Data Center.

Heretofore, for conventional postage meters, limiting physical access to a postage meter controlled use of the postage meter. It is known that a password system further controls use of the postage meter by requiring a user to enter an authorized password to activate the postage meter. With the advent of open metering systems, such as PC, network and virtual postage metering systems, limiting physical access is no longer an effective control. Although the metering device, such as the PSD, may be located remote from users, the users can dispense postage from their desks using their personal computers. Although password control provides some control, passwords are susceptible to being compromised whereby unauthorized dispensing of postage is likely.

DISCLOSURE OF THE INVENTION

It has been found that postage meter users, i.e. mailers, can effectively control postage disbursement by restricting the printing of postage evidencing with predetermined combinations of parameters required for the computation of authentication digital tokens. In doing so, the present invention minimizes unauthorized use of a postage meter and limits financial exposure of the owners of the virtual postage metering system accounts.

It has further been found that the present invention provides a method for customizing authorized use of a postage metering system whereby different users of the postage metering system may have different levels of authorized use. A further benefit of the present invention is that use of the postage metering system can be customized so that certain types or numbers of postage dispensing occur on defined days.

In accordance with the present invention, a postage metering system is programmed with postage parameter vectors each defining a set of parameters that must be present for the postage metering system to dispense postage. For each requested transaction, if any parameter of a postage parameter vector is out of range or missing, virtual postage metering system is disabled for the requested transaction.

In accordance with the present invention, a method for controlling a postage metering system defines a first set of postage parameters associated with the generation of postage evidence in a postage metering system and then initializes the postage metering system with a subset of the first set of postage parameters. The subset defines a combination of the postage parameters for which the generation of postage evidence is not authorized. When a request for postage evidence is received, the request includes a second set of postage parameters. The generation of postage evidence is inhibited when at least one of the postage parameters in the second set matches one of the postage parameters in the first set. When none of the postage parameters in the second set matches any of the postage parameters in the first set the requested postage evidence is generated. In an alternate method the subset defines a combination of the postage parameters for which the generation of postage evidence is authorized, and the requested postage evidence is generated when each of the postage parameters in the first set matches one of the postage parameters in the second set. The generation of postage evidence is inhibited when one the postage parameters in the first set does not match any of the postage parameters in the second set.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

BEST MODE OF CARRYING OUT THE INVENTION

The present invention is described as part of a virtual postage metering system. However, the present invention is suitable for use in any open or closed postage metering system in which a user can define postage parameter vectors. For example, the present invention is suitable for use in a PC metering system, such as described in U.S. Pat. No. 5,625,694, which is hereby incorporated herein by reference in its entirety.

Figure 1:
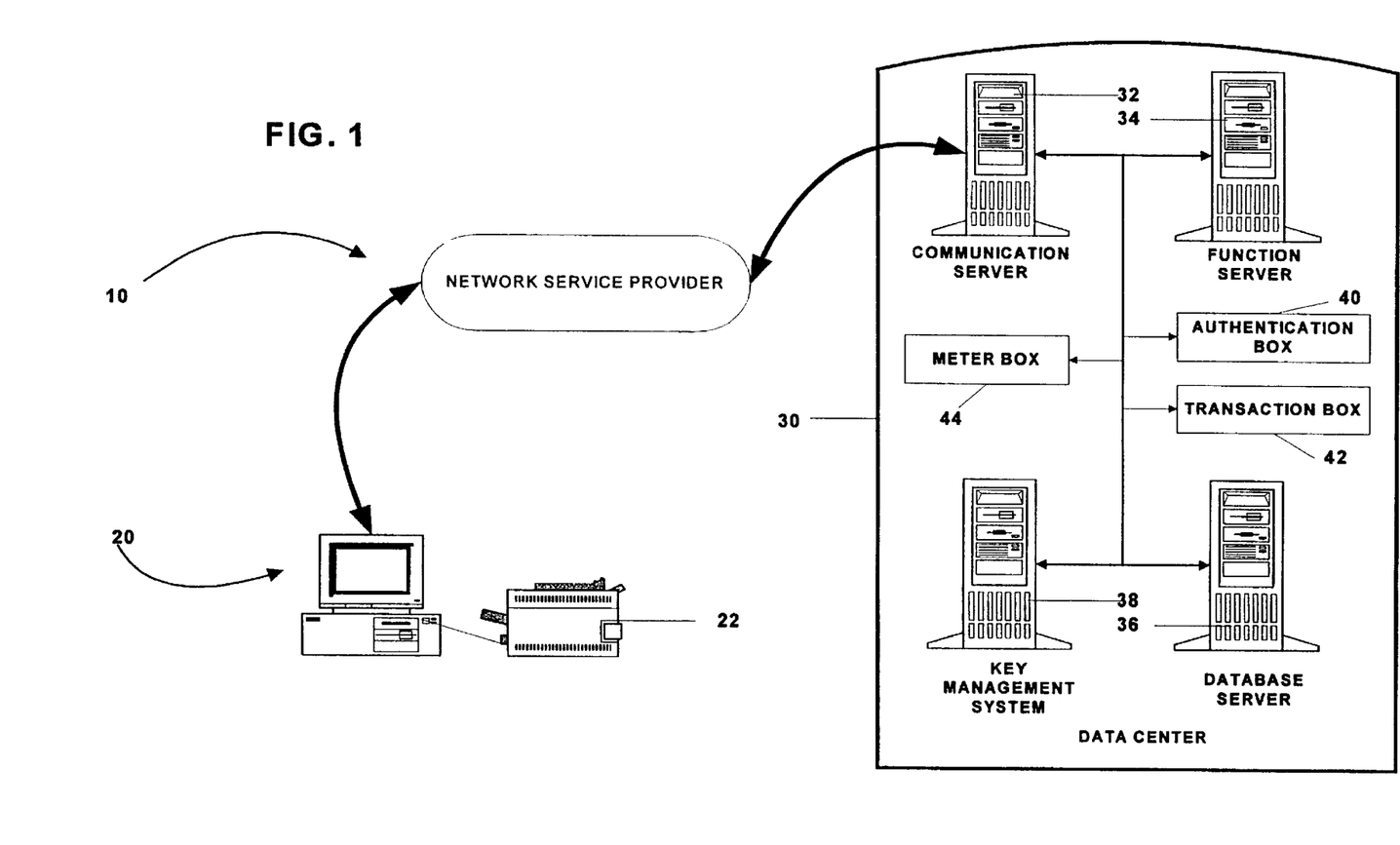
FIG. 1 is a block diagram of a virtual postage metering system for dispensing postage embodying the principles of the present invention.

In describing the present invention, reference is made to the drawings, wherein there is seen in FIG. 1, a virtual postage metering system, generally designated 10. The virtual postage metering system 10 includes a plurality (only one is shown) of personal computer (PC) systems, generally designated 20, each having access to a printer 22 for printing evidence of postage on an envelope. PC 20 is connected with a transaction processing Data Center 30 that performs postal accounting and evidencing of postage. The virtual postage metering system 10 allows each mailer to use a conventional PC to remotely obtain evidence of postage payment on an as needed basis. Unlike conventional postage metering systems, virtual postage metering system 10 does not include any meter hardware located at the mailer's site. Nor are any postal funds stored at the mailer's site. All metering and accounting of funds occur at Data Center 30 using functional software and database records representing each mailer's "postage meter", referred to herein as a "meter account".

The accounting method for virtual postage metering system 10 may be a conventional prepayment or post-payment system. The preferred method is a prepayment method wherein each mailer is required to put a minimum amount of money into the mailer's virtual meter account. As account funds drop below a specific level a refill is charged against the mailer's account. An alternate accounting method that is suitable for a virtual postage metering system is a real-time payment method in which the amount of a transaction is charged to a mailer's credit card account when the transaction occurs. This method is referred to herein as a "trickle charge" postage payment, because the mailer does not pay for postage for a mailpiece until the mailer is ready to print the mailpiece.

In the virtual postage metering system, a "meter" vendor, such as Pitney Bowes Inc., provides the mailer with client software that runs on PC 20, e.g., the client software may be downloaded from the vendor's Internet server. Alternatively, the client software may be Internet browser-based pages that provide mailer interactions with the Data Center 30. The meter vendor also manages Data Center 30. The client software initiates communications with Data Center 30 which performs metering transactions to evidence postage for single mailpieces or batches of mailpieces. In the preferred embodiment, the client software establishes a connection to the Data Center, and requests postage by providing postal information relating to the requested transactions, such as postage amount, addressee information and (optionally) the origin of deposit for each mailpiece. Data Center 30 receives the postal information, determines the origin ZIP for the mailpiece(s), performs accounting functions and generates an encrypted evidence of postage payment, such as a token or digital signature, and sends indicium information including the token, to PC 20. PC 20 receives the indicium information, creates an indicium bitmap, which can be displayed on a PC monitor (not shown) and printed on the mailpiece by printer 22. PC 20 then disconnects from Data Center 30 or requests another transaction. The connection between PC 20 and Data Center 30 may be through a Network Service Provider, such as on the Internet, or by direct dial using the PC's modem.

Virtual postage metering system 10 eliminates the need to maintain and account for traditional metering devices at each mailer's site and provides flexibility for handling requests from multiple origins of deposit by each mailer. Virtual postage metering system 10 also provides value added services that are not available with conventional meter devices, such as, real-time address hygiene, direct marketing services and trickle charge postage payment. Virtual postage metering system 10 provides mailer authentication by Data Center 30 to identify mailers with valid accounts. When a mailer has been authenticated for each request, for example, by a username, password or other conventional methods, Data Center 30 services the request, and returns indicium information to the PC 20 where the indicium is created and printed on the mailpiece.

Referring again to FIG. 1, the mailer initiates a postage evidencing transaction by running client software in PC 20, which contacts Data Center 30. At Data Center 30, a Communication Server 32 supports connectivity from various communication technologies and protocols. The Communication Server merges all incoming traffic and routes it to a Function Server 34, which includes application software that supports mailer sign-on, postage dispensing and postal reporting. All mailer and meter information is accessed from a Database Server 36 where the information is securely stored using secure cryptographic processes and protocols as described below. Data Center 30 maintains cryptographic keys for each meter account in Database Server 36. The cryptographic keys are used for postage evidencing and verification as well as for security of the records stored in Database Server 36. A Key Management System 38 administers all cryptographic keys used in virtual postage metering system 10. The cryptographic keys may be distributed to verifiers in remote locations. U.S. Pat. No. 5,812,666, assigned to the assignee of the present invention, describes such a key management system.

A mailer may establish a meter account through an on-line sign-up process with Data Center 30. During sign-up, the mailer enters, at PC 20, account information, such as user name, password and method of payment. Any registration fees can be charged at this time. Data Center 30, preferably administered by a meter vendor, such as Pitney Bowes Inc., arranges all meter licenses and agreements between its mailers and the Post.

In the present invention, the PSD does not exist, i.e., there is no metering device coupled to the PC from which postage payment is requested. Virtual postage metering system 10 replaces the accounting and metering functions of the PSD with metering software and mailer account information performed and updated at Data Center 30. The virtual postage metering system 10 provides each mailer with a metering system that has the capability of originating transactions from multiple origins of deposit. See, for example, previously noted U.S. patent application Ser. No. 09/242,206.

Various methods can be used to determine the origin of deposit for a requested transaction. For example, a method for determining origin zip code using a caller ID from a telephone call is disclosed in U.S. Pat. No. 5,943,658, assigned to the assignee of the present invention, which is hereby incorporated in its entirety by reference.

In accordance with the present invention, one or more cryptographic modules, referred to herein as secure "boxes", are located within Data Center 30 and are used to perform cryptographic processes. Each secure box is a secure, tamper-evident and tamper-responding device, including a processor and memory, that stores encryption keys and performs cryptographic operations using the keys within the secure boundary of the device. Data Center 30 includes several types of secure boxes, which are described below. In the preferred embodiment, Data Center 30 includes multiple boxes of each type for redundancy and performance.

Key Management System 38 includes a manufacturing box (not shown) that provides top-level keys used to generate random numbers for seeding each of the other secure boxes. By sharing cryptographic keys (secret and/or public), the secure boxes communicate securely within Data Center 30. Key Management System 38 also includes a "steel" box (not shown) that shares a common key with meter box 44 to encrypt/decrypt master token keys for postage evidencing transactions for each meter account. The steel box merges a vendor key and a postal key into one record in cipher text. For each meter account, Data Center 30 creates a logical meter, i.e. a meter record, in Database Server 36 by generating a token key using the vendor and postal keys, initializing meter registers (ascending and descending), meter freshness data (described below) and other postal information as part of the meter record, and then storing the meter record in Database Server 36.

Data Center 30 also includes a meter box 44 that shares a secret key with the steel box for decrypting the token key encrypted in the meter record. Meter box 44 also holds the key used for digital signature of transaction records. The only other information stored in meter box 44 is freshness data for each meter record processed by meter box 44. For each postage transaction, meter box 44 generates at least one digital token or signs the postage transaction, and updates the meter record corresponding to the transaction. Each meter record in Database Server 36 includes postal funds as well as the token keys in cipher text. Meter box 44 uses the token keys to generate tokens, updates the postal funds in the meter record, and signs the updated meter record. In this manner, meter box 44 performs and controls the secure accounting for each transaction. Meter box 44 can also be used to verify the token or the transaction signature for verification of the postage evidencing for the transaction.

Data Center 30 also includes an authentication box 40 that shares a different secret key with the steel box to decrypt a mailer authentication key stored in cipher text in Database Server 36. Authentication box 40 also executes the authentication algorithms using the decrypted authentication key to authenticate a mailer.

Finally, Data Center 30 includes an transaction box 42 that shares another secret key with the steel box to sign mailer transaction records other than the meter records signed by meter box 44, such as logins and login history records. Transaction box 42 later verifies the transaction record signature when the next transaction is requested.

Figure 2:
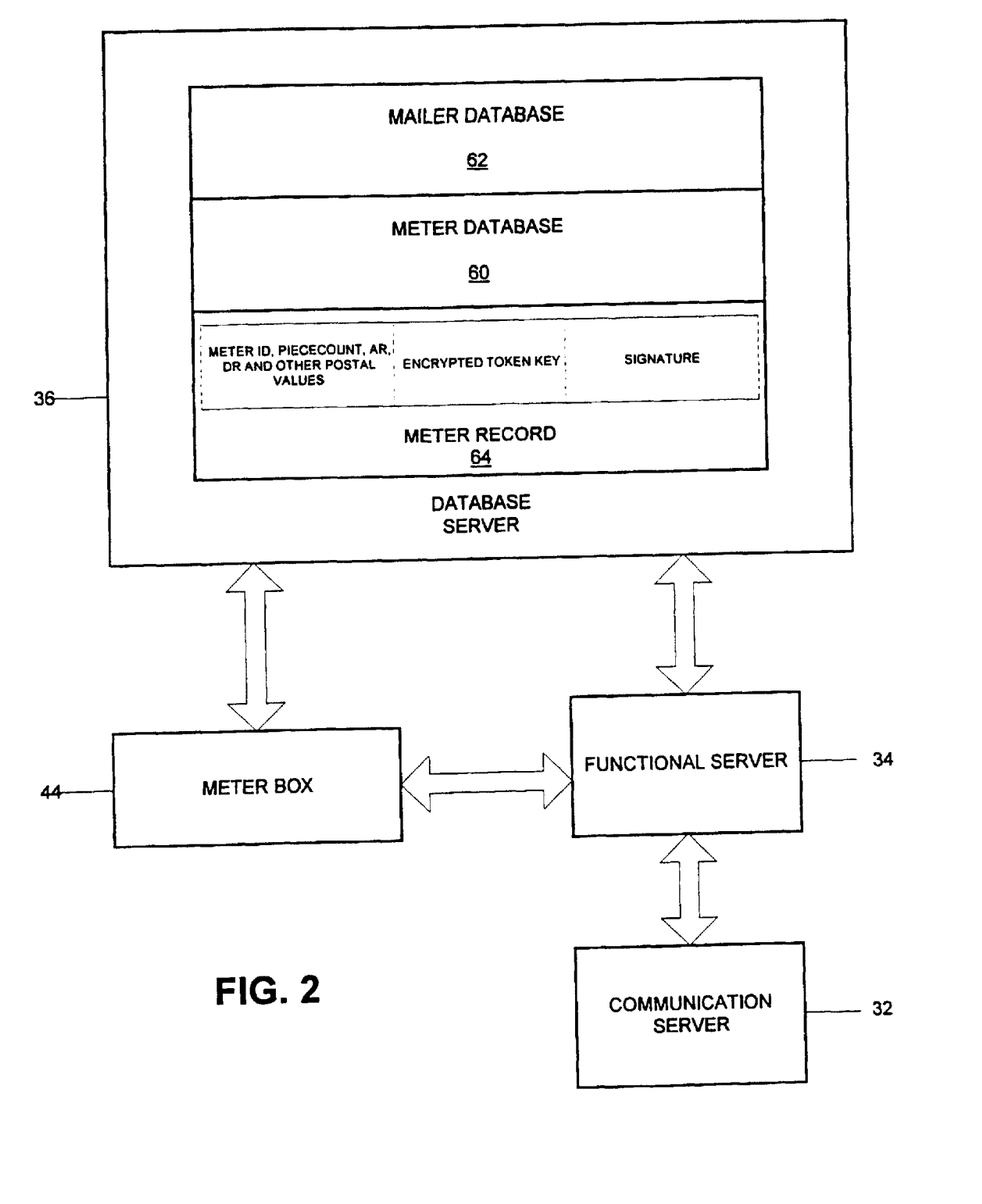
FIG. 2 is a bock diagram of the Data Center database server and secure box for the virtual postage metering system of FIG. 1.

Referring now to FIG. 2, a configuration of Database Server 36, including a meter database 60, a mailer database 62 and a database of meter records 64, is shown. Meter database 60 comprises meter information associated for each meter account, such as, meter serial number, piece count of last mailpiece, ascending register, descending register and other postal values. Mailer database 62 comprises mailer information and information that associates a mailer with a meter account.

In operation, Communication Server 32 receives a request for a meter transaction from mailer PC 20. The application software in the Function Server 34 controls the processing of the transaction request. Function Server 34 accesses mailer database 62 and meter database 60 to obtain records, including the appropriate meter record 64, corresponding to the meter account of the mailer initiating the request. Function Server 34 communicates mailer records from mailer database 62 to authentication box 40, which then authenticates the mailer requesting the transaction. Once the mailer has been authenticated, Function Server 34 communicates the appropriate meter record 64 to meter box 44, which verifies a signature and freshness data for the record. Meter box 44 decrypts the encrypted key(s) that are stored within meter record 64, performs accounting functions on the ascending and descending registers in meter record 64, and uses the key(s) to generate a token for the requested transaction. Meter box 44 then generates data for an indicium, and again signs meter record 64. The updated and signed record is then sent back to Database Server 36 where it is stored as part of meter database 60.

At Data Center 30, the authentication keys are not available in plain text, but must be distributed to the mailer. Conventional methods of distributing and updating the authentication key for each mailer can be used. See, for example, previously noted U.S. Pat. No. 5,812,666, which describes a key management system for distributing and updating cryptographic keys to the secure boxes and the mailer's PC.

Figure 3:
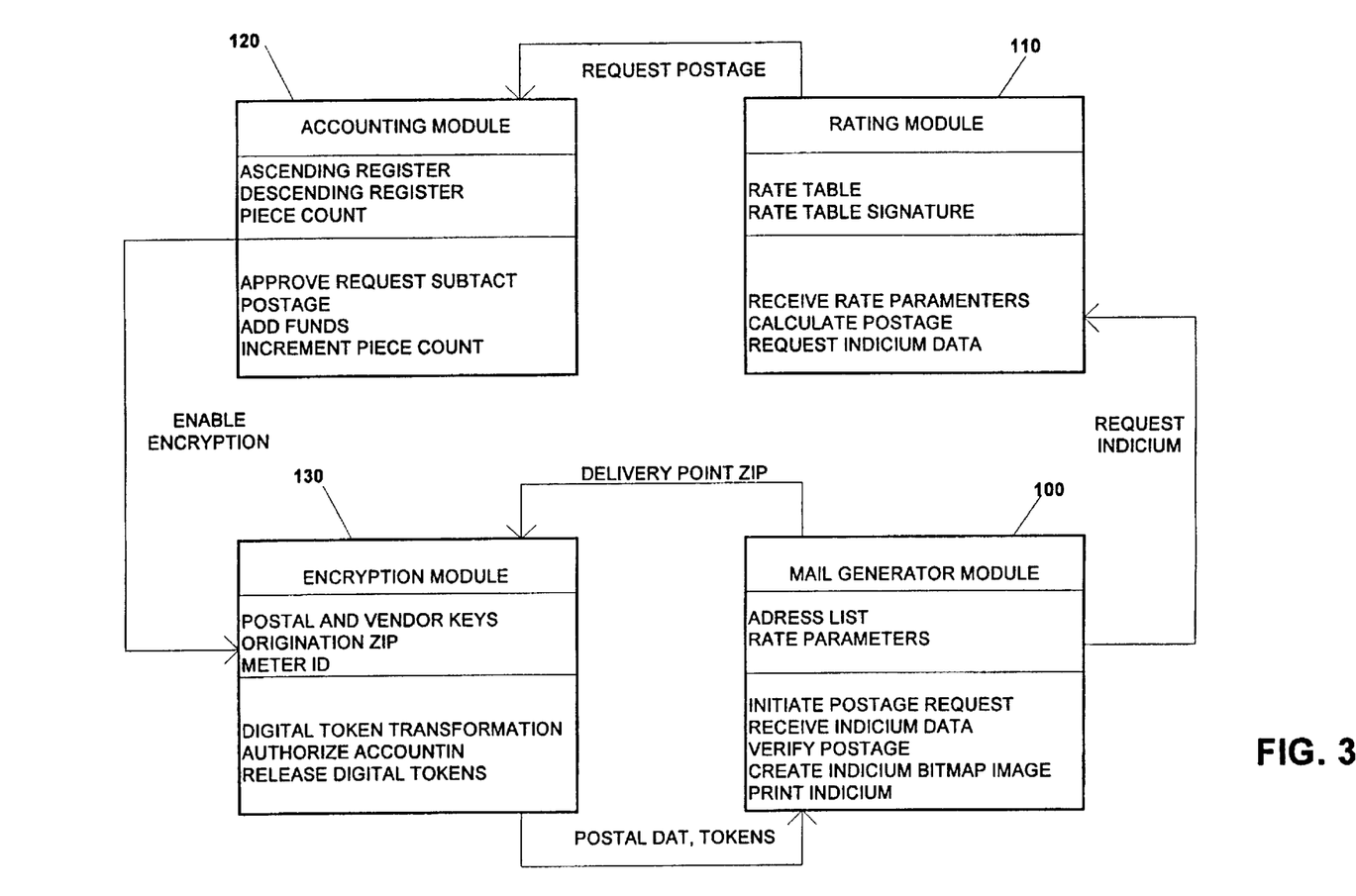
FIG. 3 is a process flow for postage authorization and printing by a postage metering system.

Postage metering systems equipped with digital printing utilize several parameters for printing a digital Indicium. Referring now to FIG. 3, a typical process flow for postage authorization and printing is shown. The process includes operations occurring in four modules in the postage metering system: a mail generator module 100, a rating module 110, an accounting module 120 and an encryption module 130. The mail generator module 100 includes a list of addresses and a list of postal rate parameters. The rating module 110 includes the current rate table and a rate table signature which authenticates the current rate table. The accounting module 120 includes an ascending register (AR), a descending register (DR) and a piece count. The encryption module 130 includes postal and vendor cryptographic keys, origin ZIP information and an identification of the postage metering system (meter ID).

In virtual postage metering system 10, mail generator module 100 resides in PC 20 and the rating, accounting and encryption modules reside at Data Center 30. The encryption module 130 resides in meter box 44, and the accounting module 120 resides in part in meter box 44 (AR, DR and piece count) and in Database Server 36 (accounting functions). The rating module 110 preferably resides in Database Server 36, however, the rating module may reside in PC 20. In a PC metering system, the accounting and encryption modules would reside in the PSD and the mail generator and rating modules would reside in the Host PC.

The following process is described for a postage evidencing transaction for a single mailpiece. It will be understood that the process may also be used for postage evidencing transactions for a batch of mailpieces.

The process begins with mail generator module 100 initiating a request for postage. Prior to this request for postage, a user has selected (for each mailpiece) a mailing address from the address list and entered or defaulted to various rate parameters for a mailpiece. The rating module 110 receives the request with the rate parameters, calculates postage amount and requests postage evidencing. It is noted that the user may enter a postage amount, which could be one of the rate parameters in which case, the rating module would defer to the entered postage amount. The accounting module 120 approves the request for postage evidencing, subtracts the postage amount from the descending register, adds the postage amount to the ascending register and increments the piece count. Once the accounting has been completed, the encryption process is enabled. The encryption module 130 performs the encryption function using the postal and vendor keys, origin ZIP received from mail generator module), meter ID, AR and DR and piece count (collectively referred to as postal data). The encryption function, which is a cryptographic transformation computation that utilizes, for example, a secret key to produce digital tokens/signatures, provides one or more digital tokens or digital signatures of the previously noted postal data. The postal data and digital tokens/signatures are collectively referred to herein as indicium data. The mail generator receives the indicium data, optionally verifies that sufficient postage has been paid and prints the indicium.

In accordance with the present invention, several parameters must be entered into the system before the indicium can be printed. The parameters define conditions and user entries that restrict postage from being dispensed and printed. For example, the following parameters are typically needed to generate a digital indicium.

$P_1$=Date of submission
$P_2$=Weight classification
$P_3$=Mail classification
$P_4$=Oversize indicator
$P_5$=Special rating parameters
$P_6$=Destination postal code
$P_7$=Piece count
$P_8$=Postal code of originating post office
$P_9$=Identity of the user In accordance with the present invention, a set of parameters $P_1, P_2, \ldots P_n$ can be described in combination as postage parameters vectors (PPV), which are used to effectively restrict printing of the indicium:

$$PPV=(P_1, P_2, P_3, \ldots P_n).$$

Under the direction of a mailer's representative responsible for the postage metering system, such as a system administrator, the postage metering system is instructed not to print if vector PPV belongs to a predefined subset of the overall set of possible values for PPV. For example, if parameters $P_1$ to $P_n$ belong to sets $$P_1 \epsilon (P_1^{min}, P_1^{max},), P_2 \epsilon (P_2^{min}, P_2^{max},), \ldots P_n \epsilon (P_n^{min}, P_n^{max},)$$

(where $\epsilon$ is the symbol indicates inclusion in a set) then the Cartesian product $$((P_1^{min}, P_1^{max},) \times (P_2^{min}, P_2^{max},) \times \ldots \times (P_n^{min}, P_n^{max},)$$

(where $P_1^{min}, P_1^{max}$ are minimal and maximal values of the parameter $P_1$) represents the set T of all possible values for the vector PPV, i.e. PPV$\epsilon$T.

In accordance with the present invention, the mailer defines a "forbidden zone", i.e., a subset of T, such that values that belong to this subset cannot be used to print postage. The subset of T can be formally defined as follows. For each parameter $P_1$ there can be a subset $F_1$ of its range $(P1^{min}, P_1^{max})$ where the mailer does not allow printing, for example, $$F_1 \epsilon (P_1^{min}, P_1^{max}).$$

$F_1$ may be 0 or any subset of $(P_1^{min}, P_1^{max})$. Then the Cartesian product $$F_1 \times F_2 \times \ldots \times F_n \epsilon T$$

represents the set of parameters where printing and accounting for postage is not allowed. In mathematical terms, $(F_1 \times F_2 \times \ldots \times F_n)$ defines a domain in multi-dimensional space. The present invention checks if a set of parameters is within or outside this domain.

Figure 4:
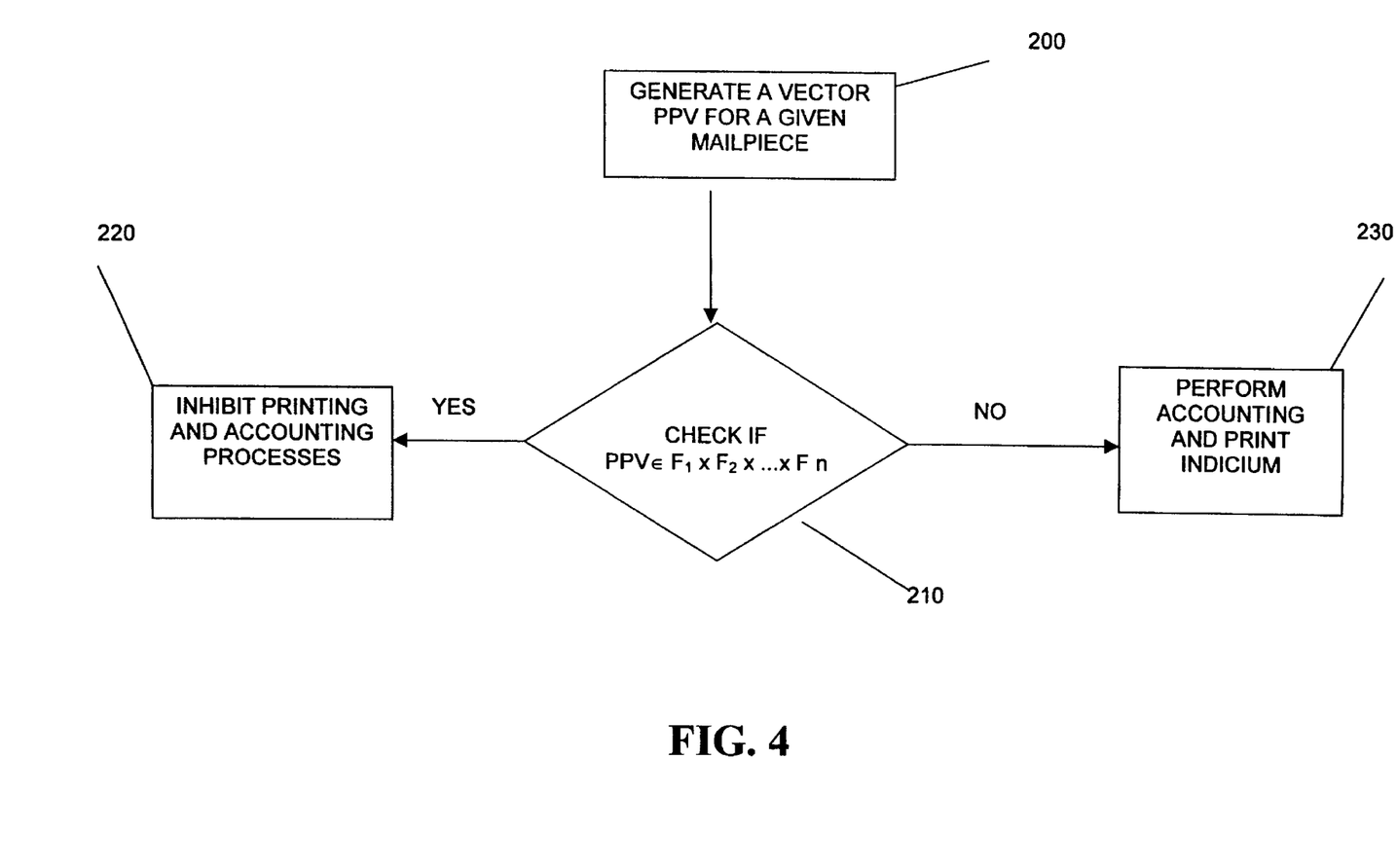
FIG. 4 is a flow chart for controlling a postage metering system in accordance with the present invention.

Referring now to FIG. 4, an algorithm is shown for controlling a postage metering system when a request for postage evidencing is made.

At step 200, a postage parameter vector is generated for a given mailpiece based on parameters selected or entered by a user. At step 210, the postage metering system determines if the postage parameter vector includes any of the set of parameters for which printing and accounting for postage is not allowed by checking the following condition:

$$PPV \subset F_1 \times F_2 \times \ldots \times F_n.$$

If the condition is satisfied, then, at step 220, the accounting and printing processes are inhibited. A message indicating that further processing has been inhibited is provided to the user. If the condition is not satisfied at step 210, then, at step 230, the accounting and printing processes are completed.

In an alternate embodiment of the present invention, $(F_1 \times F_2 \times \ldots \times F_n)$ represents the set of parameters required for printing and accounting for postage to occur. In the alternate embodiment, the postage metering system determines if the postage parameter vector includes the set of required parameters by checking the following condition:

$$PPV \epsilon F_1 \times F_2 \times \ldots \times F_n.$$

If the condition is satisfied, then the accounting and printing processes are completed. If the condition is not satisfied, then the accounting and printing processes are inhibited and a message indicating that further processing has been inhibited is provided to the user.

For each meter account, there may be sets of allowed PPV's and domains $(F_1, F_2, \ldots F_n)$. In a mathematical sense, the present invention checks for a direct product of the sets, i.e., checks if any element of $F_1$, any element of $F_2$ etc., is present in each PPV. The result will be a vector that will only be valid if all the PPV elements belong to the sets. If no element in the PPVs belongs to, for example, $F_1$, then the vector will not be valid, i.e., the set of parameters will be outside the domain defined in multi-dimensional space. If the vector is within the domain the postage metering system proceeds with postage generation.

For example, if $P_2>1$ oz and $P_6=06484$ or 06485, the postage metering system is blocked by the following set of not allowed parameters:

$$F_2=\{1\ oz+\}$$

$$F_6=\{06484, 06485\}$$

$$F_1, F_3, \ldots F_n=(P_1^{min}, P_1^{max})(P_3^{min}, P_3^{max}) \ldots (P_n^{min}, P_n^{max})$$
without additional restrictions.

The present invention provides a party that is financially responsible for a postage metering system full control over access and use of the postage metering system. A postage metering system that is accessible by multiple users is subject to users intentionally or inadvertently misusing the postage metering system. For example, a company employee may use the postage metering system for personal use, or a disgruntled employee may overpay postage for mailed items. In accordance with the present invention, defining the postal rating parameters with only rates allowed by postal regulations and by the party that is financially responsible for the postage metering system, prevents such misuse whether intentional or inadvertent. Additionally, the system administrator may add additional parameters such as destination ZIP and origin ZIP to provide further control. Furthermore, a postage metering system having multiple users may have separate PPV's defined for each user. The PPV's are accessible only by the system administrator. This ensures that operators do not know which parameters are being checked.

For example, a PPV can be defined with a parameter of ZIP 06484 that can be posted only on Fridays, which may be the date of billing. Additionally, the rating parameters may prevent posting of an operator entry of $ 3.20 instead of $ 0.32. Using piece count as a parameter allows the system administrator to control the volume of mail on a daily, weekly or monthly basis. The system administrator can update the PPVs as needed, for example, on a daily basis. When the postage metering system determines for a particular transaction that a PPV does not check out, the system provides a message back to the user to contact the system administrator.

The present invention is particularly useful for virtual postage metering systems and network metering systems because typically there is no control over the physical access of the metering system.

The present invention is also suitable for use with closed metering systems. Although there are less parameters that can be defined for a closed metering system, the present invention can be used to check for parameters that are available in a closed metering system. Closed system parameters include rating parameters, lockout dates, postage value and even user password. For example, a user may be allowed access only on certain days.

When the postal service updates its regulations or postal rates, the PPV's may be updated automatically. For example, if the postal service provides such updates on the Internet, the updates can be downloaded directly to the postage metering system to update PPV's. For virtual postage metering systems and network metering systems, the system can automatically log onto the appropriate postal service web page to update parameters associated with discounts for particular mailing on a particular day.

It will be understood that, although the embodiments of the present invention are described as postage metering systems, the present invention is applicable to any value metering system that includes transaction evidencing, such as monetary transactions, item transactions and information transactions.

While the present invention has been disclosed and described with reference to embodiments thereof, it will be apparent, as noted above, that variations and modifications, such as using public keys instead of private keys, may be made therein. It is, thus, intended in the following claims to cover each variation and modification that falls within the true spirit and scope of the present invention.

What is claimed is:

1. A method for controlling a postage metering system, the method comprising the steps of:

defining a first set of postage parameters associated with the generation of postage evidence in a postage metering system;

initializing the postage metering system with a subset of the first set of postage parameters, said subset defining a combination of the postage parameters for which the generation of postage evidence is not authorized;

receiving a request for postage evidence, said request including a second set of postage parameters;

inhibiting the generation of postage evidence when at least one of the postage parameters in the second set matches one of the postage parameters in the first set; and generating the requested postage evidence when none of the postage parameters in the second set matches any of the postage parameters in the first set.

2. The method of claim 1 wherein the second set of postage parameters describes a postage parameter vector.

3. The method of claim 2 comprising the further steps of:

defining the subset of the first set of postage parameters as a domain; and determining whether the postage parameter vector is within the domain.

4. The method of claim 1 wherein the set of postage parameters includes rating parameters, destination postal codes, and origin postal code.

5. A method for controlling a postage metering system, the method comprising the steps of:

defining a first set of postage parameters associated with the generation of postage evidence in a postage metering system;

initializing the postage metering system with a subset of the first set of postage parameters, said subset defining a combination of the postage parameters for which the generation of postage evidence is authorized;

receiving a request for postage evidence, said request including a second set of postage parameters;

generating the requested postage evidence when each of the postage parameters in the first set matches one of the postage parameters in the second set; and inhibiting the generation of postage evidence when one of the postage parameters in the first set does not match any of the postage parameters in the second set.

6. The method of claim 5 wherein the second set of postage parameters describes a postage parameter vector.

7. The method of claim 6 comprising the further steps of:

defining the subset of the first set of postage parameters as a domain; and determining whether the postage parameter vector is within the domain.

8. The method of claim 5 wherein the set of postage parameters includes rating parameters, destination postal codes, and origin postal code.

* * * * *